3,827,935
APPARATUS FOR IN-CORE INSTRUMENTATION
OF PRESSURIZED WATER REACTORS
Wolf Grüner, Hans-Peter Schabert, and Franz Schubert, Erlangen, Germany, assignors to Siemens Aktiengesellschaft, Berlin and Munich, Germany
Filed Oct. 7, 1970, Ser. No. 78,669
Claims priority, application Germany, Oct. 24, 1969, P 19 53 605.1
Int. Cl. G21c 17/10
U.S. Cl. 176—19 R          13 Claims

ABSTRACT OF THE DISCLOSURE

A nuclear reactor of the pressured water type is equipped with in-core instrumentation apparatus which has vertically displaceable instrumentation shafts passing from above through the head cover of the reactor pressure vessel. Yoke structures extend horizontally from each instrumentation shaft in the space between the cover and the core assembly. Finger-like groups of rigid instrument guide tubes for respective measuring probes extend from each yoke downwardly into the core assembly.

---

Our invention relates to in-core instrumentation of pressurized water nuclear reactors.

As a rule, vertical channels in the nuclear fuel elements, such as vacant control-rod guide tubes, are used for accommodating the measuring sensors or probes which are shoved into the channels from above or below the pressure vessel of the reactor. In a known design, numerous thin tubes pass through the bottom of the reactor pressure vessel and extend outwardly of the vessel in wide curves toward the top. For measuring the neutron flux, miniature chambers can be shoved from above into the tubes to pass first to the bottom of the vessel and thence upwardly into the fuel elements. This requires many penetrations in the bottom of the reactor pressure vessel and thus involves an appreciable safety risk for the nuclear plant, aside from the fact that the shape and size of the reactor building is unfavorably affected and that it is difficult to accommodate not only the insertable measuring chambers but also stationery sensors through the thimble tubes described above.

In another known reactor design, individual so-called thimble tubes for the reception of displaceable probes with selectively stationery or movable sensors are shoved from above into the core skeleton assembly of the reactor. This requires several port studs to be used in the center of the reactor cover above the center of the core assembly because the displaceable probes can be shoved only through guiding tubes of a large curvature radius so that it is not feasible to pass measuring sensors from the marginal region to the center of the core. The center port studs of the reactor cover thus required for in-core instrumentation, cannot be occupied by control rods. This reactor design also makes it necessary to sever all of the displaceable probe assemblies each time the reactor pressure vessel is to be opened, this being necessary because of the radioactive contamination of the probes. When reclosing the reactor vessel, new probes must be inserted. The number of sealing localities then to be newly closed and tightened is large so that the replacement of fuel elements involves an excessively large amount of time.

In a further known reactor design, a telescoping frame is arranged above the core assembly, and straight vertical probe fingers are fastened to the frame. The frame further carries shafts which extend near the rim of the core from below through port studs cover of the reactor vessel where they are sealed. This kind of frame assembly, however, has been found mechanically unstable and subject to trouble. Any repair of the frame structure, for example in the event of failure of individual measuring probes, is extremely time consuming.

It is therefore an object of our invention to devise an apparatus for in-core instrumentation of pressurized water nuclear reactors which combines a comparatively simple design with the advantage that instrumentation shafts, though passing through the head cover of the reactor vessel in the marginal region thereof, nevertheless permit passing measuring sensors or probes into centrally located fuel elements or openings of the core.

Another object of our invention is to afford a reliable insertion of slender instrument guide tubes into the reactor core without the danger of breakage or buckling of these tubes.

A further object, subsidiary to those already mentioned, is to avoid the necessity of providing any port openings in the bottom of the pressure vessel.

Still another object of our invention is to avoid using for in-core instrumentation any control-rod positions above the core.

A further object of our invention is to provide an apparatus for in-core instrumentation which permits a repeated use of the probes after an exchange of nuclear fuel elements.

It is also an object of our invention to provide the port openings in the cover of a pressurized water reactor, that is the localities at which the instrumentation shafts pass from the interior through the cover to the outside, with relatively few mechanical sealing means which can be so readily exchanged as to correspondingly shorten the down time required for an exchange of the fuel elements.

To achieve these objects, and in accordance with a feature of our invention, we provide a nuclear reactor of the pressurized water type with in-core instrumentation apparatus which comprises rigid instrument guide tubes inserted from above into the tubular fuel elements or other vertical channels of the core assembly, and we further provide the apparatus with vertically displaceable instrumentation shafts passing from above through the head cover of the reactor pressure vessel. Respective yoke structures extend horizontally from the shafts and carry each a finger-like group of the above-mentioned rigid instrument guide tubes so that each of these tubes extends from one of the yokes downwardly into the core assembly, such as into the interior of a tubular fuel element. The measuring sensors or probes are accommodated within the guide tubes.

By virtue of the yokes and the instrument guide tubes attached thereto, a uniform distribution of the guide tube from the rim toward the center of the core is obtainable over the entire cross-section of the core without the necessity of leaving control-rod positions vacant above the core. Each individual guide tube, thus suspended from a yoke, is guided in a nuclear fuel element within a control-rod guide tube not needed for reactor control purposes.

The yokes may be rigidly connected with the instrumentation shafts and may be movably mounted relative to the skeleton structure of the core assembly. However, the yokes may also have a fixed relation, such as pivot, to the core structure or the hoods of the control-rod guiding inserts, and in the latter case may be articulately joined with the instrumentation shafts.

Each of the instrument guide tubes in apparatus according to the invention may be equipped with a plurality of stationary measuring probes or with a discontinuously measuring ball-type probe, or with probes of both types. The electrical leads of the probes coordinated to one of the respective yokes are bundled together on the yoke and extend to the outside through the interior of the appertaining instrumentation shaft.

The instrumentation shafts are pressure-tightly sealed in the head cover of the reactor pressure vessel. Preferably the sealing of the shaft at the locality where it passes through the cover is effected by means of a double seal, and the space between the two seals is connected with a duct through which this space is subjected to suction. Particularly well suitable for such a double seal are two serially arranged sealing rings which are self-sealing under the internal pressure of the reactor vessel and which have a wedge-shaped cross-section, the sealing edges being preferably designed as spear edge or as so-called flow beds. To provide for a simple assembling of such a double seal, a pressure clamping device common to both seals may be employed.

The above-mentioned and further objects, advantages and features of our invention, said features being set forth with particularity in the claims annexed hereto, will be mentioned in, and will become apparent from, the following description of embodiments of pressurized water reactors with in-core instrumentation equipment according to the invention illustrated by way of example on the accompanying drawings in which:

Figure 1:
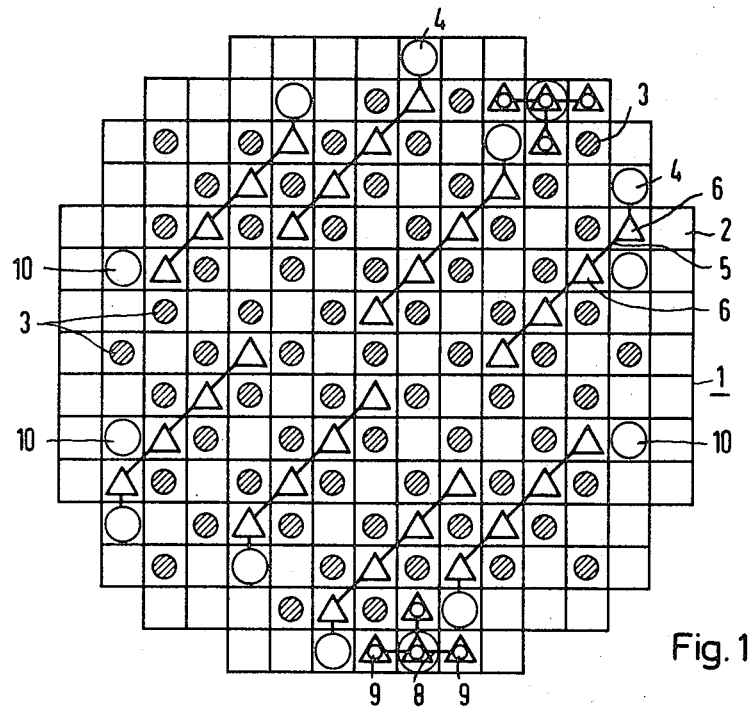
FIG. 1 shows schematically a cross-section through a reactor core assembly with nuclear fuel rods and an example of the control-rod and instrumentation distribution.

According to the example in FIG. 1, the reactor core 1 is equipped, for example, with 193 fuel elements 2 into which respective control rods 3, such as cadmium rods, are inserted. The control rods are uniformly distributed over the entire cross-section of the core, with the exception of a marginal zone. According to the invention, a number of instrumentation shafts 4 are provided in the outer region of the core 1. From each of the shafts 4 there extends a yoke 5 horizontally in the inward direction. Attached to the yokes 5 are, for example, groups of four instrument guide tubes 6 which serve to receive respective stationary or movable sensors or probes. Furthermore, at two outer positions of the core, there are provided cross-shaped yokes 8 with guide tubes for the reception of ball-type probes 9. The illustrated example further shows four instrumentation positions 10 without any yokes, the latter positions serving to receive thermocouples.

It will be seen from the cross-sectional illustration of FIG. 1, that by virtue of the above-described arrangement of the yokes, virtually the entire core region can be equipped with corresponding probes from the peripherally marginal area without requiring the occupation of essential control-rod positions.

Figure 2:
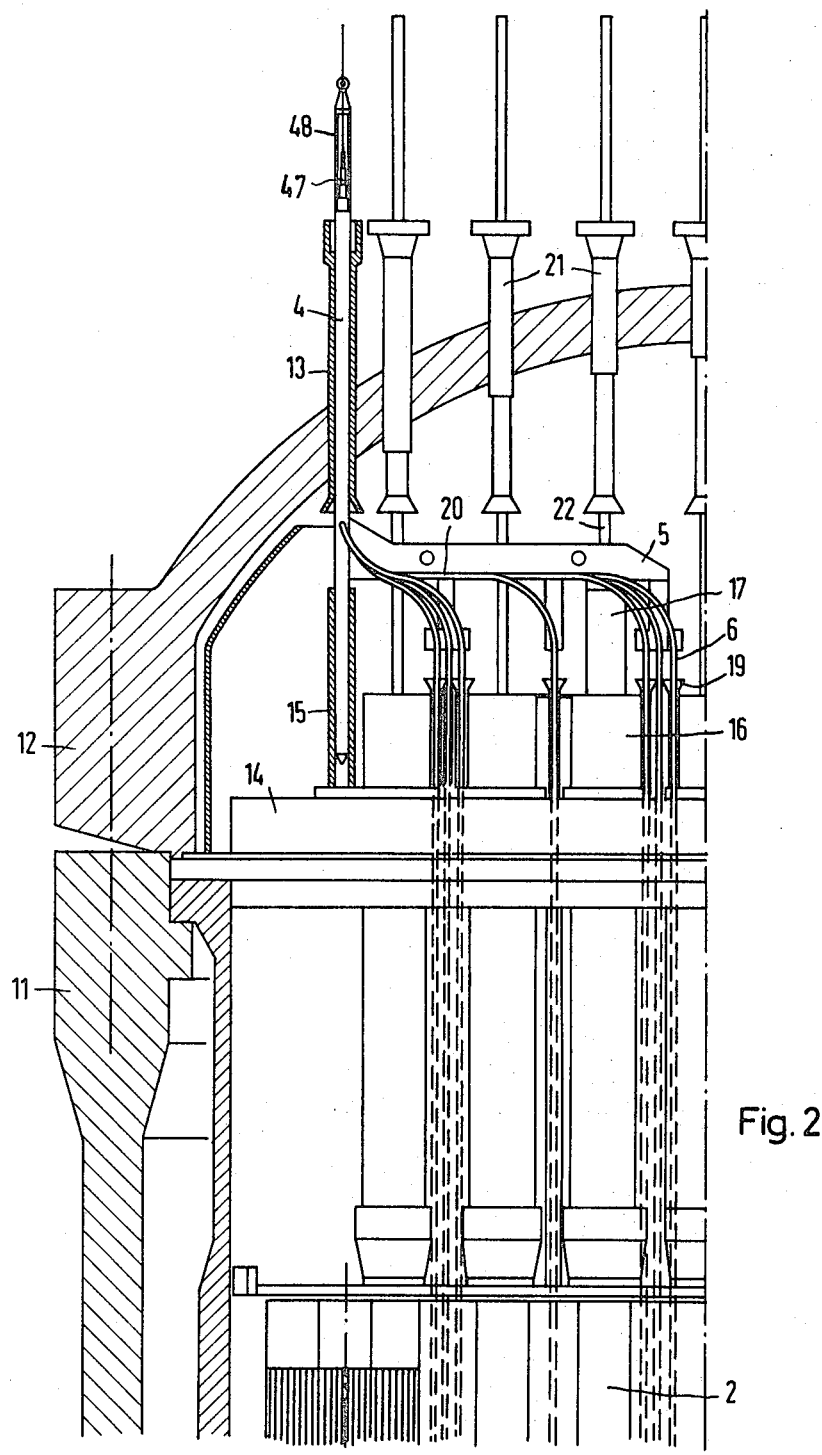
FIGS. 2 and 3 show respectively two embodiments of reactor with a different design and arrangement of the instrumentation shafts, yokes and instrument guide tubes, each of these illustrations showing only part of a reactor in longitudinal section.

The sectional view exemplified in FIG. 2 will further elucidate the design of the in-core instrumentation according to the invention. The reactor pressure vessel 11 is closed by a head cover 12 which is provided with a separate tubular stud or port 13 for the passage of an instrumentation shaft 4 containing the electric leads to which the measuring probes are connected. The lower end of the shaft 4 is axially guided by a sleeve 15 fastened on top of the core assembly 14. A yoke 5 is rigidly fastened to the instrumentation shaft 4 from which the yoke extends horizontally inward in the space between the cover 12 and the core assembly 14. The yoke 5 may have its outer end horizontally freely movable upon a support 17 which is placed upon the insert 16 mounted on top of the core structure for the purpose of guiding the control rods.

The individual instrument guide tubes 6 extend vertically from the yoke 5 down into the fuel elements 2 or into vacant control-rod guide tubes. To facilitate the insertion of the guide tubes, the exemplified embodiment is provided with a funnel 19 at the hood of the control-rod guiding insert 16, the funnels 19 have tubular extension reaching downwardly into the fuel elements. The electric leads 20 of the probes coordinated to one of the respective yokes are bunched or bundled together in this yoke 5 and pass to the outside through the interior of the instrumentation shaft 4. The leads terminate at the top of the instrumentation shaft in an electric coupling member 47 which, for the purpose explained hereinafter, can be covered by a protective hood or sleeve 48. At the upper end of the tubular stud 13, the instrumentation shaft 4 is pressure-tightly sealed relative to the tubular port stud tube as will also be more fully described hereinafter.

Figure 3:
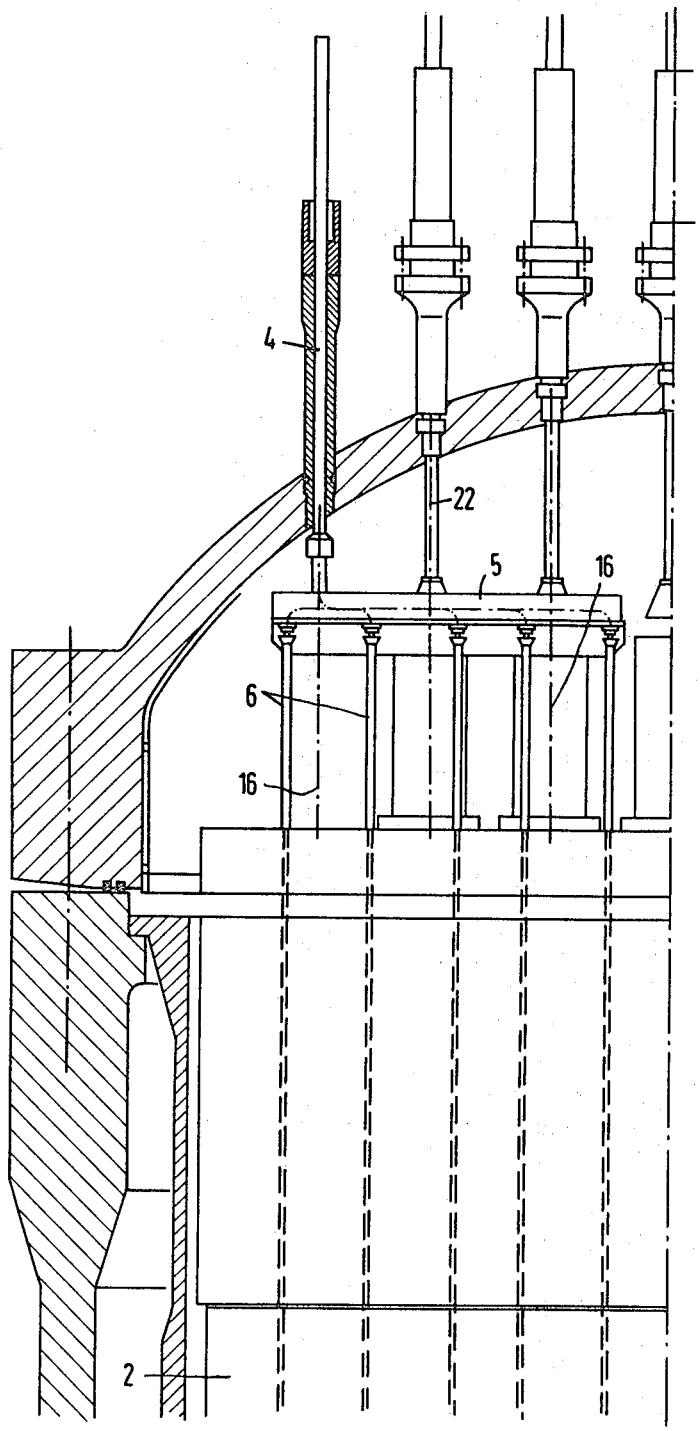

FIG. 3 illustrates a different design of the yoke 5. The yoke 5 is fastened by screws upon the hoods 16' of the control-rod guiding inserts 16 or is fastened in any other suitable manner and movably connected with the instrumentation shaft 4. The individual instrument guide tubes 6 in this embodiment also extend downwardly from the yoke between the guide inserts 16 for the regulating rods 22.

Figure 4:
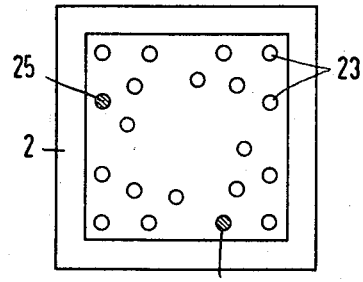
FIG. 4 is a schematic illustration of a cross-section through a fuel element indicating the position of the probes within the element.

FIG. 4 showing a cross-section through one of the fuel elements 2, exemplifies the arrangement of the individual control rods and probes, the individual fuel rods being not shown in this illustration. Individual control rods are located at the positions 23, whereas for example a ball-type probe is located at position 24, and a stationary measuring-chamber probe is inserted at position 25.

Figure 5:
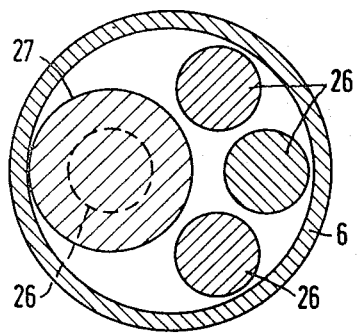
FIG. 5 is a cross-section of an instrument guide tube equipped with stationary probes.

FIG. 5 represents a cross-section through a guide tube 6 for stationary probes which are located at different heights of the reactor core. In the illustrated example, four stationary measuring chambers are arranged in the guide tube 6. Three coaxial cables 26 constitute the electric conductors leading to the measuring chambers situated underneath the plane of illustration and to a measuring chamber 27.

Figure 6:
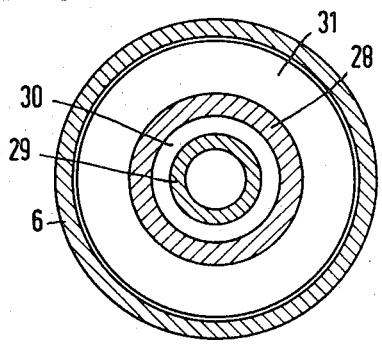
FIG. 6 is a cross-section through an instrument guide tube with a ball-type probe.

FIG. 6 shows a cross-section through a guide tube 6 for a spherical (ball) type probe. A pressure tube 28 extends coaxially within the guide tube 6. A further coaxial guide tube 29 is located in the center. The balls of the probe are to be shot into the inner guide tube 29. The interspace 30 between the guide tube 29 and the pressure tube 28 serves to supply compressed air when the balls are to be shot out of the guide tube assembly.

Figure 7A:
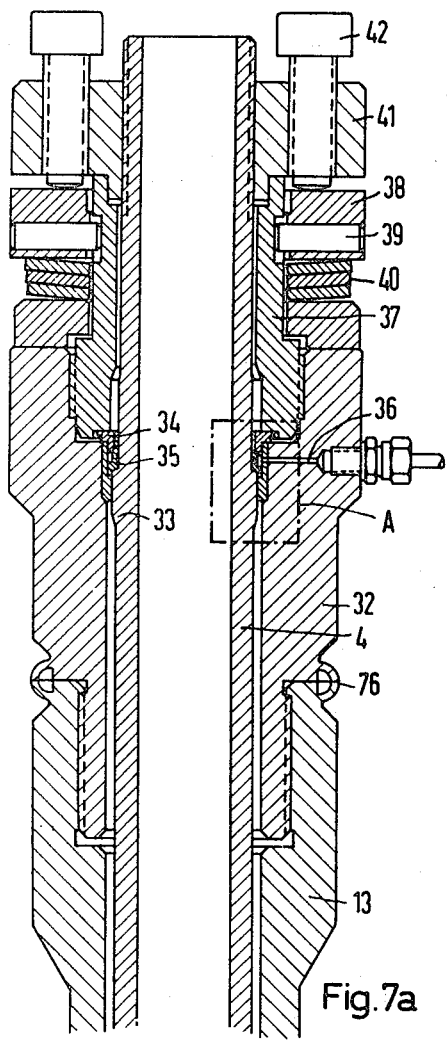
FIGS. 7a and 7b are a longitudinal view and a plan view respectively of an instrumentation shaft with a double seal.

The outer intermediate space 31 between the pressure tube 28 and the guide tube 6 is filled with water, i.e. the coolant of the reactor. It is important to provide for a reliable but readily exchangeable seal where the instrumentation shafts 4 pass through the respective tubular studs 13 of the reactor cover. A longitudinal section through such a seal and the corresponding clamping device is illustrated in FIG. 7a. The instrumentation shaft 4 proper extends from the inside of the reactor vessel to the outside through tubular ports 13 which are tightly screwed into the reactor cover and welded thereto.

A stub-shaped top 32 is screwed from above into the stud 13 and welded thereto at the locality 76. In the upper portion of the top 32, the shaft 4 has a bulge 33 pointing outwardly. Disposed in the annular gap between the shaft 4 above the bulge 33 and the top 32 are two seals 34 and 35 designed as flow-bed rings. The space between the two rings communicates with a suction duct 36 through which this space can be kept under negative pressure.

Figure 7B:
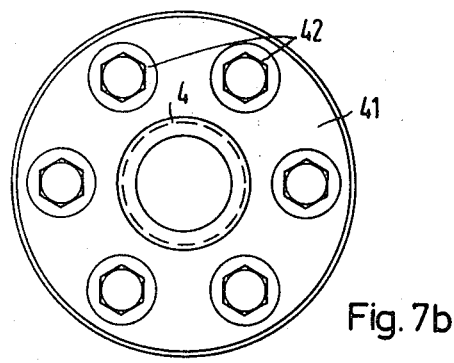

The double seal just described is kept under sealing pressure by means of the device described presently. The rings 34 and 35 are pressed against the instrumentation shaft 4 and against the surrounding stud or port 13 by means of a clamping piece 37 of cylindrical shape which is screwed from above into the top 32 of the stud or port 13. A threaded clamping sleeve 37 can be screwed downwardly with the aid of a ring 38 which has horizontal bores for the insertion of tools. The connection in the radial direction is effected by means of pins 39. For reliable clamping a pack of disc springs 40 is inserted between the ring 38 and a plate plate of the top 32. A clamping ring 41 is seated on top of the assembly and can be tightened against the ring 38 by means of peripherally distributed bolts 42 (FIGS. 7a, 7b).

Figure 8:
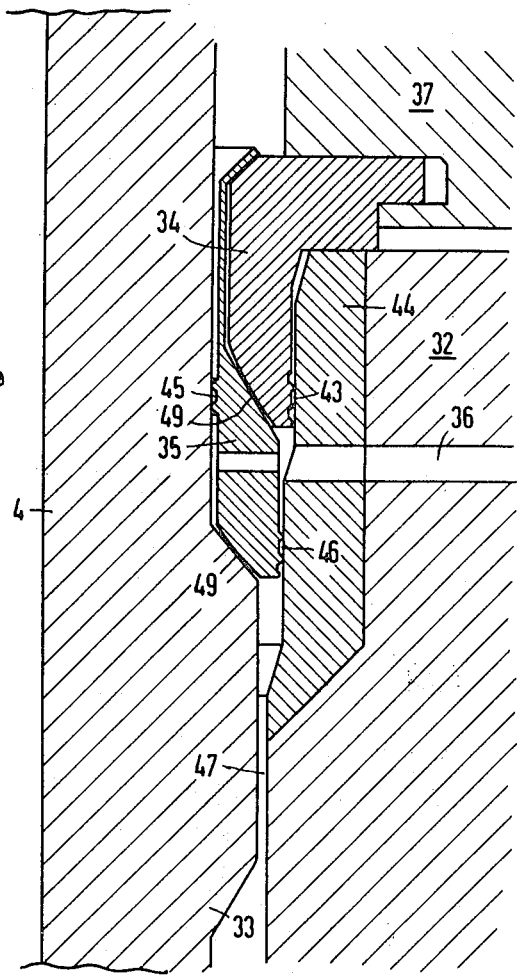
FIG. 8 shows, on a larger scale, a portion of FIG. 7a surrounded in FIG. 7a by a dot-and-dash line.

The two sealing rings 34 and 35 are mounted above a bulge 33 (FIG. 8) of the instrumentation shaft 4. The illustrated sealing rings consist of so-called flow-bed rings, the upper ring 34 being provided with a flow bed 43 on the outer side to effect sealing relative to the top 32 which at this location has a welded-on portion 44. The lower sealing ring 35 forms two flow beds 45 and 46 directed inwardly to the instrumentation shaft 4 and outwardly to the top 32. By tightening the sleeve 37, the two sealing rings become fixed with respect to their height. Thereafter the clamping ring 41 with the springs 40 and the bolts 42 are used to pull the instrumentation shaft upwardly against the sealing rings 35 and 34. These rings therefore provide a safe pressure seal against the reactor pressure which obtains in the annular gap 47 and which augments the pressing force acting on the sealing rings.

By using the suction duct 36 (FIGS. 7a, 8) any leakage can be recognized immediately upon assembling the reactor so that it is not necessary to wait and check the seals after the entire reactor has been started up to operating pressure. In the event of leakage, the considerable loss of time otherwise encountered after replacement of the fuel elements, can be avoided. The illustrated seal has the further advantage that the sealing rings 34, 35 need be inserted only after the reactor cover 12 (FIG. 3) has already been lowered onto the vessel and over the instrumentation shafts, so that damage to the sealing rings due to closing of the vessel is prevented.

When inserting or removing in-core instrumentation equipment according to the invention, for example in the event of refueling or when the sensors have reached the end of their useful lifetime, the electrical connections located at the upper end of the instrumentation shafts are to be loosened. Then the screw connection of the tightening device 41, 38 is opened and the sealing rings 34, 35 are removed. A watertight hood or envelope 48 (FIG. 2) is shoved over the electrical coupling member 47 remaining at the upper end of the shaft. Now the cover 12 of the reactor vessel can be removed. The reactor space within the vessel is simultaneously flooded, and the instrumentation shafts 4 together with the yokes 5 and the instrument guide tube 6 can now be pulled out of the core assembly and suspended in a separate tank. Before exchanging the fuel elements, all of the in-core instrumentation devices are pulled out.

A special device is needed to secure the operations just described, and especially when the instrument guide tubes are to be inserted into the fuel elements while reliably preventing buckling of these tubes otherwise apt to occur because of their slenderness. Such an auxiliary device is shown in detail in FIGS. 9a and 9b.

The device comprises a guiding frame with two vertical guide tubes 50 and 51 and a lower transverse bridge 52. Two glide sleeves 54 and 55 coaxially surround the respective guide tubes 50, 51 on which they are guided by roller bearings 53. The sleeves 54 and 55 carry a cam guide member 56 which carries at its bottom two holders 57 and 58. Two horizontal and parallel shafts 59 and 60 are journalled on the two holders 57 and 58. Each of these shafts carries a set of guide sheet members 61 and 62, the number of these members on each shaft corresponding to the number of instrument guide tubes 6 per yoke. The sheet members 61 on the upper shaft 59 have recesses 63 on the right-hand side. The members 62 on the lower shaft 60 have similar recesses on the left-hand side.

Figures 9A, 9B:
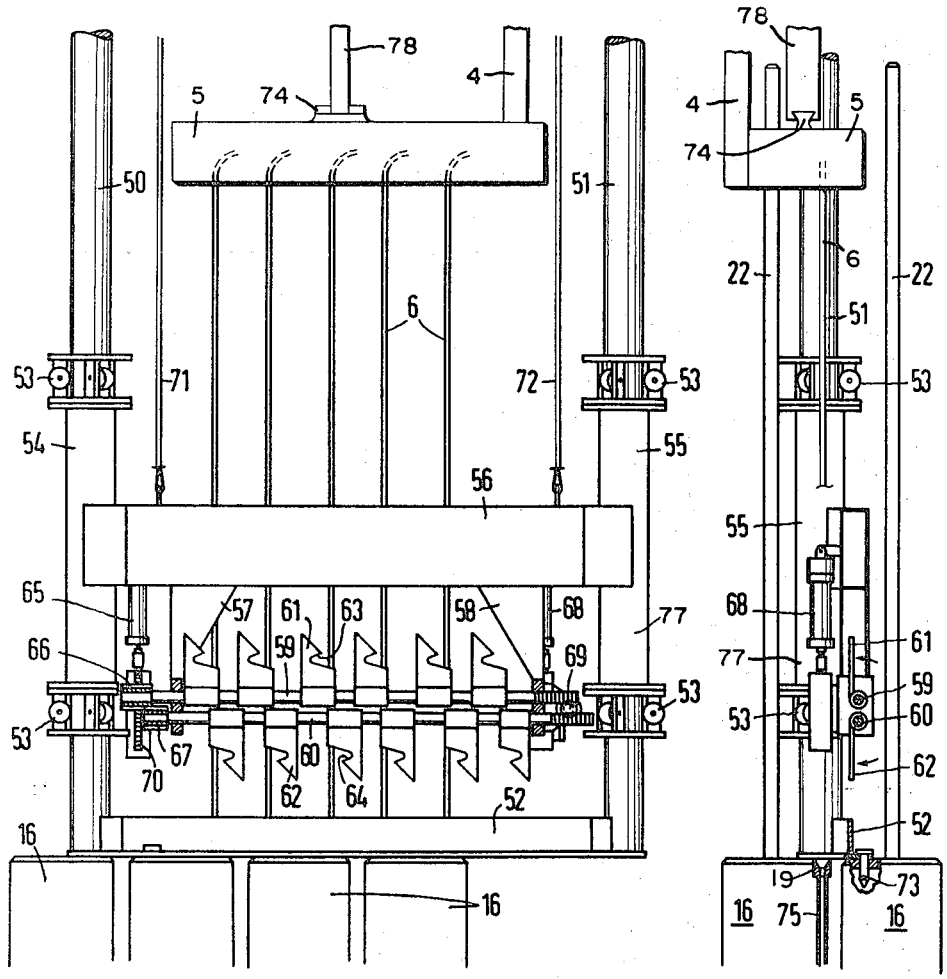
FIGS. 9a and 9b are respectively a front view and a side elevation of a device for guiding the instrument guide tubes into the core.

In the inactive condition of the auxiliary device, the members 61 and 62 are in vertical positions parallel to the longitudinal direction of the instrument guide tubes 6, this inactive condition being shown in FIGS. 9a and 9b.

Figure 10:
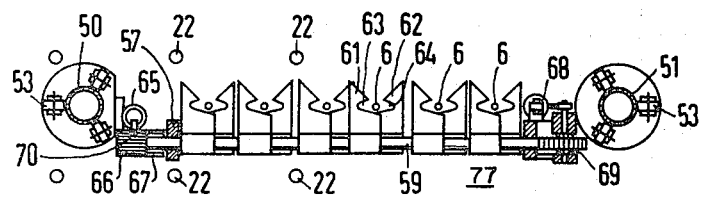
FIG. 10 is a top view onto the partially closed device of FIGS. 9a and 9b.

The insertion of a yoke 5 with the appertaining instrument guide tubes 6 is effected in the following manner. It is assumed that the yoke with the instrument guide tubes is suspended in the fuel element tank outside of the pressure vessel and core assembly of the reactor. First the yoke 5 with its guide tubes 6 is pulled to the highest position with the aid of a gripper which for example, forms part of the charging machinery or of an auxiliary bridge or crane. Now the auxiliary device shown in FIGS. 9a and 9b is run toward the lances of the reactor. The pneumatic cylinders 65 (FIGS. 9a, 10) are then actuated to rotate spur gears 66 and 67 mounted on the ends of the respective shafts 59 and 60. This turns the comb-shaped members 61 and 62 inwardly to the horizontal positions illustrated in FIG. 10. By now actuating the pneumatic cylinder 68, a gear transmission comprising a spur gear 69 displaces the shafts 59 and 60 with members 61 and 62 toward each other so that the recesses 63 and 64 tightly surround and firmly hold the respective instrument guide tubes 6. Simultaneously the displacement of the lower shaft 60 brings a gear 67 into engagement with a rack 70 of the pneumatic cylinder 65 so that now the gears 66 and 67 are arrested relative to each other, whereby any buckling of the instrument guide tubes is prevented. The structure 56 is then lowered by means of ropes 71 and 72 of the charging machinery down to the middle of the length of the instrument guide tubes.

Now the tool device with the guide tubes attached thereto is transferred to the nuclear reactor proper and is then centered, relative to the core, on the regulator-rod inserts 16 by means of a centering pin 73 (FIG. 9b). After such centering the guide member 56 is lowered to the lowermost position. After thus lowering the yoke, the instrument guide tubes 6 are centered in the corresponding guide funnels 19 of the guide tube 75 in the regulator-rod guide inserts 16 by incrementally raising the transverse member 56 and simultaneously lowering the guide tubes. These tubes can now be reliably shoved into the core without any danger of buckling. When the yoke is inserted down to the transverse member 56, the tool members 61 and 62 are moved to the open positions, the auxiliary device is lifted, and the yoke is set down upon the core where, if desired, the yoke may be fastened.

The tool 77 aids in inserting and removing the instrument guide tubes 6 into and from the guide tubes in the core. In this case, the cam guide member 56 of the tool 77, as well as the yoke 5, are held by the loading machine, which is indicated through the gripping device 78.

It will be recognized that the described auxiliary device adapted to in-core instrumentation apparatus according to the invention, secures a reliable insertion of the instrument guide tubes without danger of breaking or buckling them.

An essential advantage of reactor in-core instrumentation according to the invention is the fact that no ports are needed in the bottom portion of the reactor pressure vessel. Furthermore, no control-rod positions above the core are needed for inserting the instrumentation. The probes can be used repeatedly after refueling, and stationary as well as movable sensors are applicable. Furthermore, a few mechanical sealing devices suffice to seal the in-core instrumentation components relative to the reactor vessel, and these mechanical seals can be readily exchanged so rapidly as not to appreciably prolong the down time required for the exchange of the fuel elements.

Upon a study of this disclosure it will be apparent to those skilled in the art that our invention permits various modifications and may be given embodiments other than those particularly illustrated and described herein, without departing from the essential features of the invention and within the scope of the claims annexed hereto.

We claim:

1. With a nuclear reactor of the pressurized water type having a reactor vessel a core assembly for accommodating vertically elongated tubular fuel elements in said vessel and a head cover on top of said vessel in upwardly spaced relation to said core assembly, the combination of in-core instrumentation apparatus comprising vertically displaceable instrumentation shafts passing from above through said head cover, yoke structures extending horizontally from said respective shafts between said cover and said core assembly, and a finger-like group of rigid instrument guide tubes for respective measuring probes, said guide tubes extending from each of said yokes downwardly into said core assembly.

2. In apparatus according to claim 1, each of said yokes being rigidly connected with one of said respective instrumentation shafts and being vertically displaceable relative to said core structure.

3. In apparatus according to claim 1, said yokes having a fixed pivot relative to said core assembly and being articulately joined with said respective instrumentation shafts.

4. In apparatus according to claim 1, said instrumentation shafts being situated in the outward radial range of said core assembly, and said yokes extending into the central region of said core assembly.

5. In apparatus according to claim 1, at least one of said instrument guide tubes being provided with a plurality of fixed measuring probes.

6. In apparatus according to claim 1, at least one of said instrument guide tubes being provided with movable spherical probes.

7. Apparatus according to claim 1, comprising measuring probes in said guide tubes and electric leads connected to said probes, the leads of the probes in one of said respective groups of guide tubes being bunched together in the one yoke structure from which said one group extends; and said leads passing to the outside through the one of said shafts from which said latter yoke structure extends.

8. In apparatus according to claim 7, said head cover having respective tubular port members through which said instrumentation shafts pass to the outside, two sealing means axially spaced from each other in each of said port members for sealing the passage of said shafts, and suction duct means communicating with the space between said two sealing means.

9. In apparatus according to claim 8, said two sealing means comprising two respective rings having respective annular wedge faces engaging each other and having respective further annular wedge faces engaging said guide tube and said tubular port member respectively.

10. Apparatus according to claim 9, comprising a clamping device connected with said sealing means for conjointly exerting sealing pressure upon both of said rings.

11. Apparatus according to claim 1, comprising measuring probes in said guide tubes and electric leads connected to said probes, the leads of the probes in one of said respective groups of guide tubes extending through the appertaining one of said instrumentation shafts, said latter shaft having at its exterior end a plug connector member (47), to which said leads are connected, and a watertight cap member (48) removably placeable upon said connector member when disassembling the apparatus.

12. With nuclear reactor in-core instrumentation apparatus according to claim 1, the combination of assembling means for guiding the finger groups of instrument guide tubes into the proper openings of said core assembly, said assembling means comprising a lifting device engageable with said yoke for raising the latter, and a guide tool vertically displaceable independently of said lifting device and substantially surrounding said instrument guide tubes individually during insertion of said latter tubes into said core assembly.

13. In apparatus according to claim 12, said guide tool comprising two parallel shafts with drive means for rotating them, two groups of comb-type guide members mounted on said respective two shafts, each two of said members adjacent to each other on said respective shafts having respective recesses located opposite each other and straddling one of said respective instrument guide tubes when said two shafts are turned to a given active guide position.

References Cited

UNITED STATES PATENTS

| 3,178,355 | 4/1965 | Jacobs | 176—19 LD |
| 3,263,081 | 7/1966 | Wiesemann et al. | 176—19 R |

FOREIGN PATENTS

| 871,726 | 6/1961 | Great Britain | 176—19 R |

REUBEN EPSTEIN, Primary Examiner